United States Patent
Tsubaki

(10) Patent No.: US 9,148,578 B2
(45) Date of Patent: Sep. 29, 2015

(54) IMAGE CAPTURE APPARATUS, CONTROL METHOD THEREOF, AND RECORDING MEDIUM

(71) Applicant: CANON KABUSHIKI KAISHA, Tokyo (JP)

(72) Inventor: Hidetoshi Tsubaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 384 days.

(21) Appl. No.: 13/653,903

(22) Filed: Oct. 17, 2012

(65) Prior Publication Data

US 2013/0120610 A1 May 16, 2013

(30) Foreign Application Priority Data

Nov. 11, 2011 (JP) .................................. 2011-247962

(51) Int. Cl.
*H04N 5/235* (2006.01)

(52) U.S. Cl.
CPC ..................................... *H04N 5/235* (2013.01)

(58) Field of Classification Search
CPC ............... H04N 5/2355; H04N 5/355–5/3559; G06T 5/007–5/009; G06T 2207/20208
USPC ........ 348/169, 221.1, 229.1, 230.1, 235, 296, 348/297, 362, 363, 364, 366, 367
See application file for complete search history.

(56) References Cited

U.S. PATENT DOCUMENTS

| | | | |
|---|---|---|---|
| 5,929,908 A * | 7/1999 | Takahashi et al. ............. | 348/364 |
| 6,583,823 B1 * | 6/2003 | Shimada et al. .............. | 348/616 |
| 7,024,108 B2 * | 4/2006 | Takahashi ..................... | 396/234 |
| 2010/0091119 A1 | 4/2010 | Lee | |
| 2011/0069200 A1 * | 3/2011 | Oh et al. ..................... | 348/229.1 |
| 2012/0194686 A1 * | 8/2012 | Lin et al. .................... | 348/208.4 |
| 2012/0249830 A1 * | 10/2012 | Tsubaki ...................... | 348/229.1 |

FOREIGN PATENT DOCUMENTS

| | | |
|---|---|---|
| CN | 101262564 A | 9/2008 |
| CN | 102004918 A | 4/2011 |
| JP | 2002-101347 A | 4/2002 |
| JP | 2008-104009 A | 5/2008 |
| KR | 10-2005-0019891 A | 3/2005 |
| KR | 10-2010-0033363 A | 3/2010 |

OTHER PUBLICATIONS

Mikio Takagi, Haruhisa Simoda, Handbook of Image Analysis [Revised Edition], University of Tokyo Press, Sep. 2004.
Office Action issued in counterpart Korean application No. 10-2012-0124657 on Oct. 4, 2014.
Chinese Office Action issued in corresponding application No. 201210455437.5 on Mar. 4, 2015.

* cited by examiner

*Primary Examiner* — Lin Ye
*Assistant Examiner* — Chriss Yoder, III
(74) *Attorney, Agent, or Firm* — Carter, DeLuca, Farrell & Schmidt, LLP

(57) ABSTRACT

The number of images to be composited used to generate a dynamic range-extended image, and exposure conditions for respective images to be composited are determined. A proper exposure condition is determined for a subject corresponding to a moving object region, and one of the exposure conditions of the images to be composited is changed to the proper exposure condition. An image capture apparatus specifies a moving object region for a plurality of images to be composited, which are captured under the exposure conditions of the images to be composited including the proper exposure condition. A dynamic range-extended image is generated using pixels of the image to be composited, which is captured under the proper exposure condition, as those of the moving object region, which is specified for the plurality of images to be composited.

9 Claims, 11 Drawing Sheets

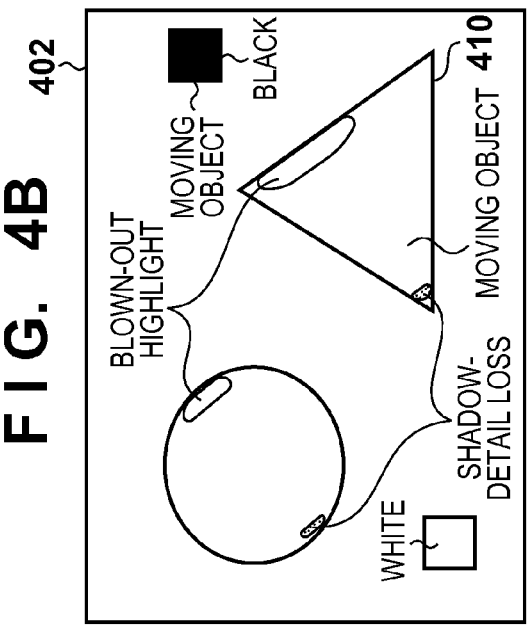
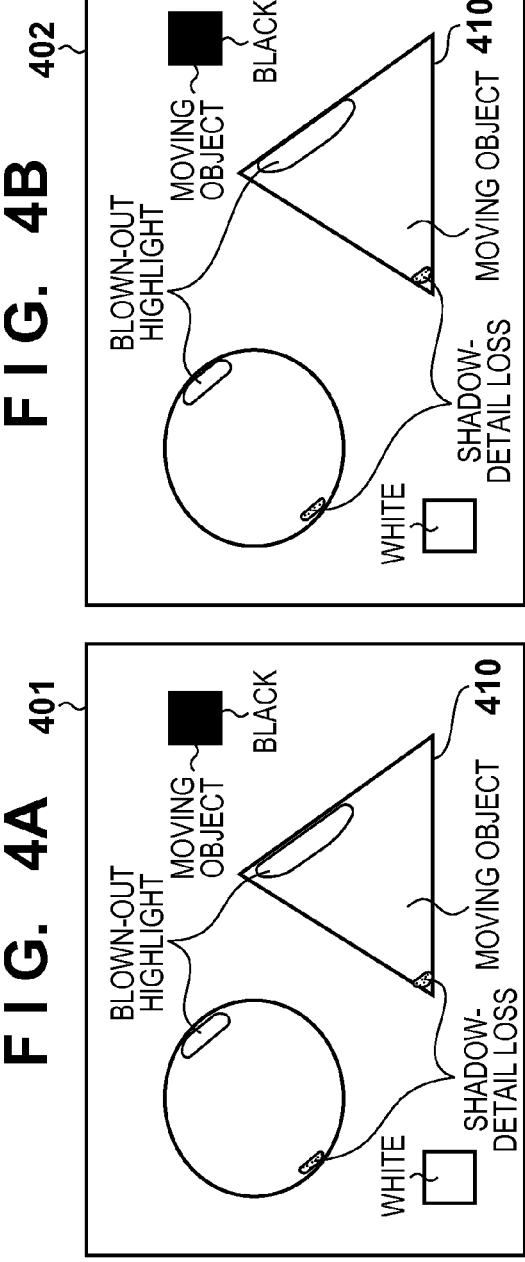
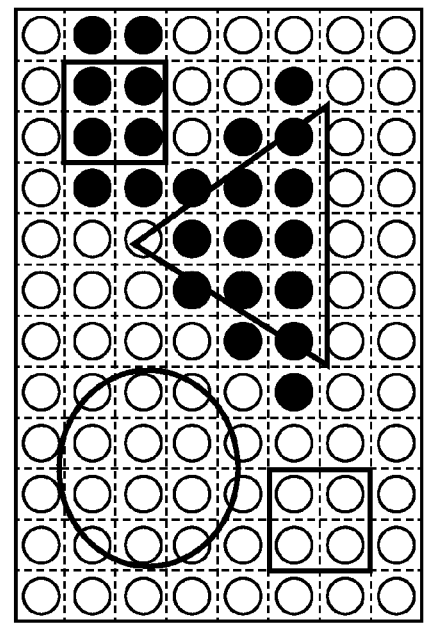

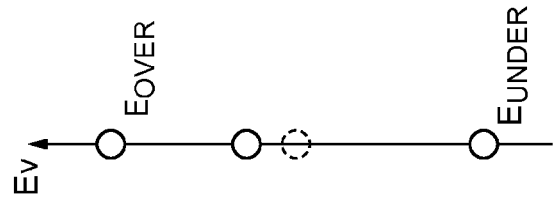
FIG. 8D
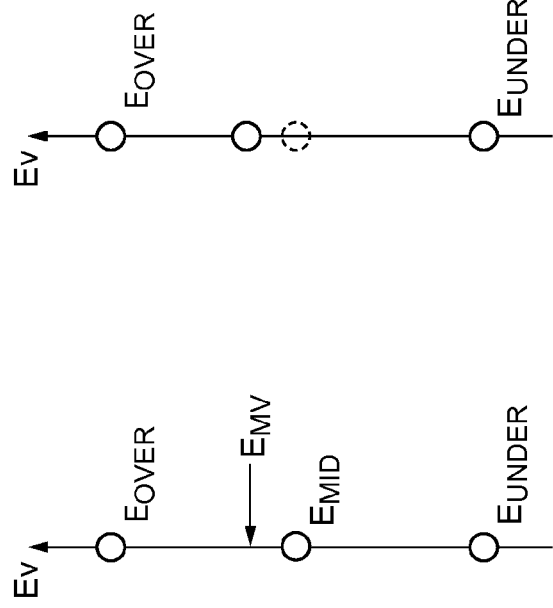
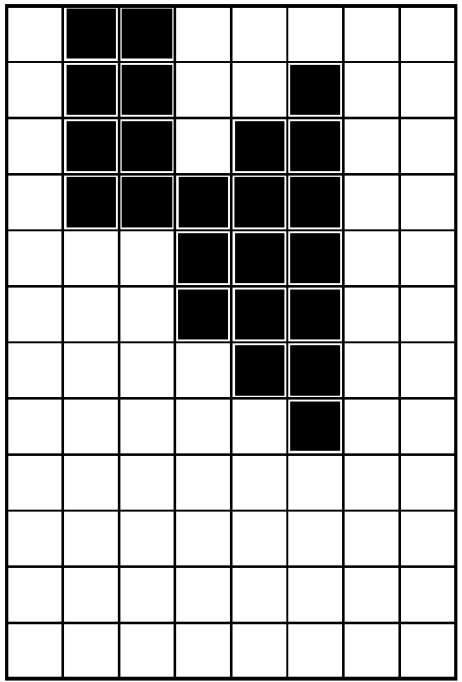
FIG. 8C
FIG. 8B
FIG. 7
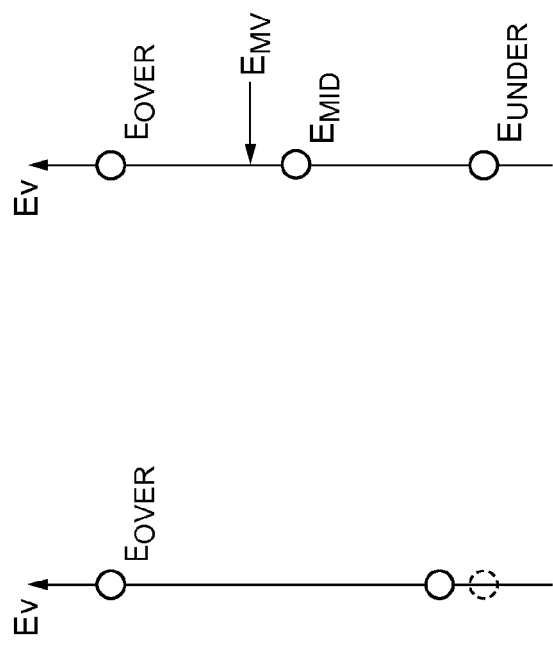
FIG. 8A

IMAGE CAPTURE APPARATUS, CONTROL METHOD THEREOF, AND RECORDING MEDIUM

BACKGROUND OF THE INVENTION

1. Field of the Invention

The present invention relates to an image capture apparatus, control method thereof, and recording medium and, more particularly, to a dynamic range extending technique which extends a tone range by compositing a plurality of differently exposed images.

2. Description of the Related Art

In recent years, some image capture apparatuses such as digital cameras and digital video cameras have a dynamic range extending function which obtains an image whose tone range is extended by compositing a plurality of differently exposed images, which are obtained by capturing images of a subject using different exposure times.

Japanese Patent Laid-Open No. 2008-104009 discloses an image capture apparatus which generates an HDR image by capturing two different images, which respectively fall within luminance ranges on a high-luminance side and low-luminance side by detecting a highest luminance on the high-luminance side and a lowest luminance on the low-luminance side when a captured image does not fall within a predetermined luminance range.

Also, a technique for dynamically controlling image composition in dynamic range-extended image generation processing (to be referred to as HDR image generation processing hereinafter) so as to avoid image discontinuity in a composite image output by the HDR image generation processing when a moving object is included has been disclosed.

Japanese Patent Laid-Open No. 2002-101347 discloses the following technique. That is, when an HDR image is generated using two images, that is, an underexposed image and overexposed image, a region where image discontinuity may occur is specified based on differences between tone levels of normalized images, and replacement to the underexposed image is inhibited in that region.

However, even when the aforementioned method of Japanese Patent Laid-Open No. 2002-101347 is used, pixels extracted from both the overexposed image and underexposed image may often be used in a moving object region of the HDR image generated by composition, thus posing a problem of texture discontinuity in the moving object region.

SUMMARY OF THE INVENTION

The present invention has been made in consideration of the problems of the conventional techniques. The present invention provides an image capture apparatus which avoids image discontinuity in an image, a tone range of which is extended by compositing a plurality of differently exposed images, a control method thereof, and a recording medium.

The present invention in its first aspect provides an image capture apparatus for generating a dynamic range-extended image by compositing a plurality of images to be composited, comprising: an image capture unit configured to output an image obtained by capturing a subject; a determination unit configured to determine the number of images to be composited used to generate a dynamic range-extended image, and exposure conditions for the respective images to be composited from a distribution of pixel values of the subject; a first specifying unit configured to specify a moving object region for a plurality of pre-shot images output from the image capture unit; a change unit configured to determine a proper exposure condition for a subject corresponding to the moving object region specified by the first specifying unit, and to change one exposure condition of the exposure conditions of the images to be composited determined by the determination unit to the proper exposure condition; a second specifying unit configured to specify a moving object region for the plurality of images to be composited, which are captured by the image capture unit under the exposure conditions of the images to be composited including the proper exposure condition; and a generation unit configured to generate the dynamic range-extended image by compositing the plurality of images to be composited, the generation unit using pixels of the image to be composited captured under the proper exposure condition as pixels of the moving object region specified by the second specifying unit.

Further features of the present invention will become apparent from the following description of exemplary embodiments (with reference to the attached drawings).

BRIEF DESCRIPTION OF THE DRAWINGS

FIGS. 4A, 4B, and 4C are views for explaining moving object regions according to the embodiment of the present invention;

FIG. 7 is a view showing a photometry region corresponding to moving object regions according to the embodiment of the present invention;

FIGS. 8A, 8B, 8C, and 8D are views for explaining changes of exposure conditions according to the embodiment of the present invention;

DESCRIPTION OF THE EMBODIMENTS

A preferred embodiment of the present invention will be described in detail hereinafter with reference to the drawings. Note that an embodiment to be described hereinafter will exemplify a case in which the present invention is applied to a digital camera, as an example of an image capture apparatus, which can output an image whose dynamic range is extended (HDR image) by compositing a plurality of images obtained by capturing images of a subject to have different exposure times. However, the present invention is applicable to an arbitrary apparatus, which can output an image whose dynamic range is extended by compositing a plurality of images obtained by capturing images of a subject to have different exposure times. In this specification, "image discontinuity" will generically express problems about transparency, texture discontinuity, image lag, multiple edges, and pattern mixture in an HDR image.

Transparency, texture discontinuity, image lag, multiple edges, and pattern mixture in an HDR image will be described first. Generation of an HDR image by a dynamic range extending technique described in Japanese Patent Laid-Open No. 2008-104009 requires a plurality of images to be composited, which are obtained by a plurality of image capturing operations having different exposure levels in association with a subject. However, when subjects include a moving object, since images to be composited have different moving object regions, an image discontinuity problem occurs in an HDR image obtained by compositing the images to be composited.

Figure 2:
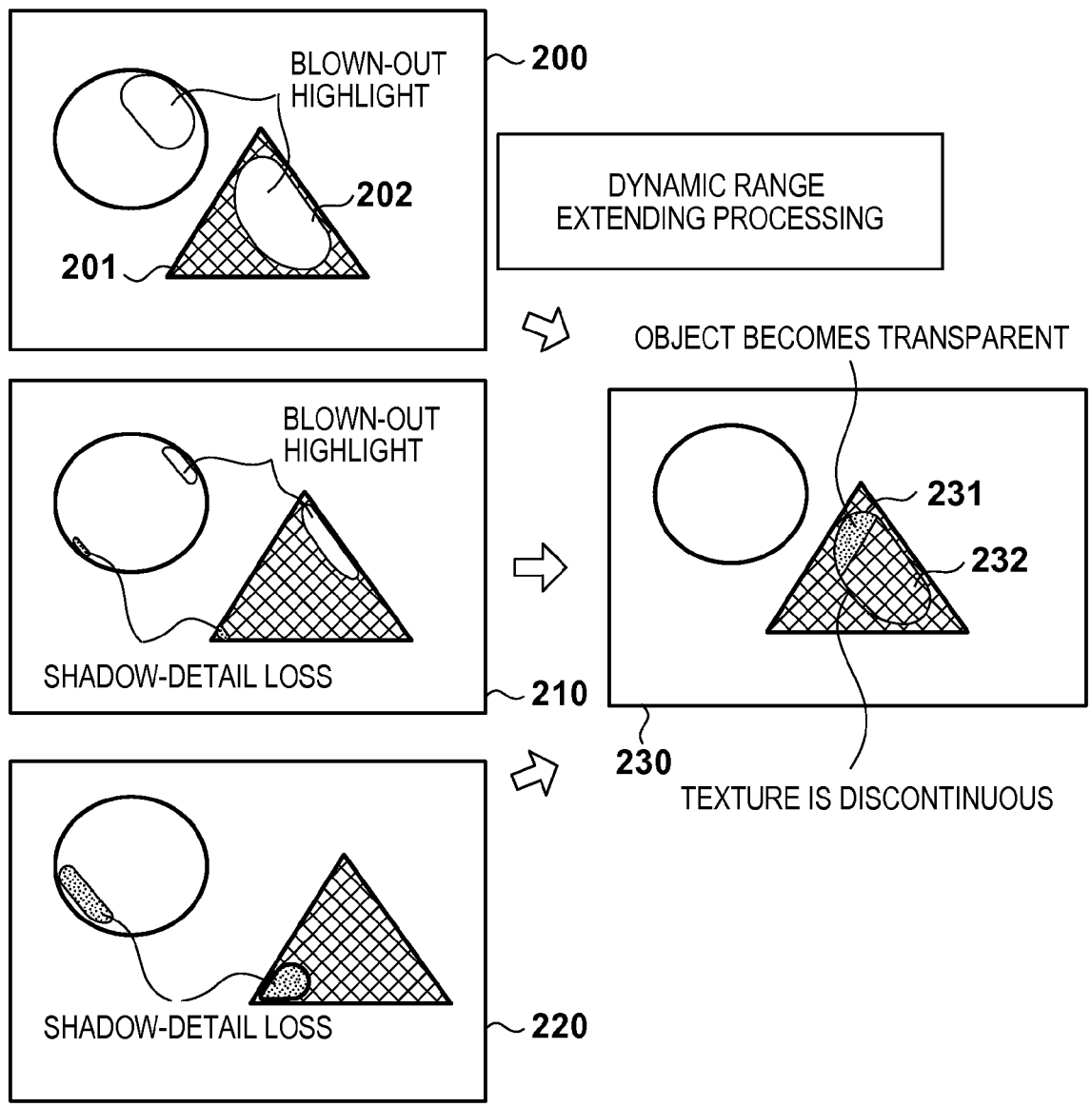
FIG. 2 is a view for explaining image discontinuity in an HDR image, which is caused by the conventional dynamic range extending processing.

More specifically, when a subject includes a moving object, an HDR image obtained by compositing images obtained by a plurality of image capturing operations suffers the following problems associated with image discontinuity. For example, when a case will be assumed wherein a moving object region 201 includes a blown-out highlight region 202 in an overexposed image 200, as shown in FIG. 2, the following problems are posed.

1. When pixels are replaced using those of an underexposed image 220 including no moving object in a region at the same position as the blown-out highlight region 202, a transparent region 231 where a background is seen through is generated in the moving object region of an HDR image 230 (transparency).

2. When pixels are replaced using those of an underexposed image 220 in which a moving object exists in a region at the same position as the blown-out highlight region 202 but its position is different, a texture pattern of a moving object surface becomes discontinuous at a boundary of a corresponding region 232.

3. Unlike in FIG. 2, when an overexposed image includes a blown-out highlight region in a background region, and when a moving object in an underexposed image exists at an occluding position of that region, images are composited by replacement of pixels of the blown-out highlight region to those of the underexposed image as if there were a plurality of images of the moving object (image lag).

Not only pixel replacement processing but also composition processing using weighted averaging of a plurality of images in a halftone range also cause image discontinuity such as multiple edges around a moving object and pattern mixture in added moving object regions as problems posed at the time of the conventional image composition processing.

Note that even when the aforementioned method of Japanese Patent Laid-Open No. 2002-101347 is used, pixels extracted from both the overexposed image and underexposed image may often be used in a moving object region of the HDR image generated by composition, thus posing a problem of texture discontinuity in the moving object region.

On the other hand, a method of eliminating image discontinuity by specifying a region where change amounts of pixel values are equal to or larger than a threshold from differences of all of a plurality of images captured to generate an HDR image, and generating an HDR image using pixels extracted from one image for those of that region may be used. However, a selected image from which pixels to be assigned to a region where change amounts of pixel values are equal to or larger than the threshold are extracted may often include a blown-out highlight region or shadow-detail loss region, and a desired dynamic range extending effect cannot often be obtained in the obtained HDR image. Especially, when an overexposed image and underexposed image used to generate an HDR image are captured according to the highest luminance and lowest luminance like in Japanese Patent Laid-Open No. 2008-104009, both the images may include a blown-out highlight region or shadow-detail loss region, and a desired dynamic range extending effect cannot be obtained.

Hence, according to the present invention, a proper exposure condition for a moving object region included in an image is determined, one of exposure conditions of two or more images is changed to the proper exposure condition to capture the two or more images, and pixels of the image captured under the proper exposure condition are used for a region determined as a moving object region.

<Functional Arrangement of Digital Camera>

Figure 1:
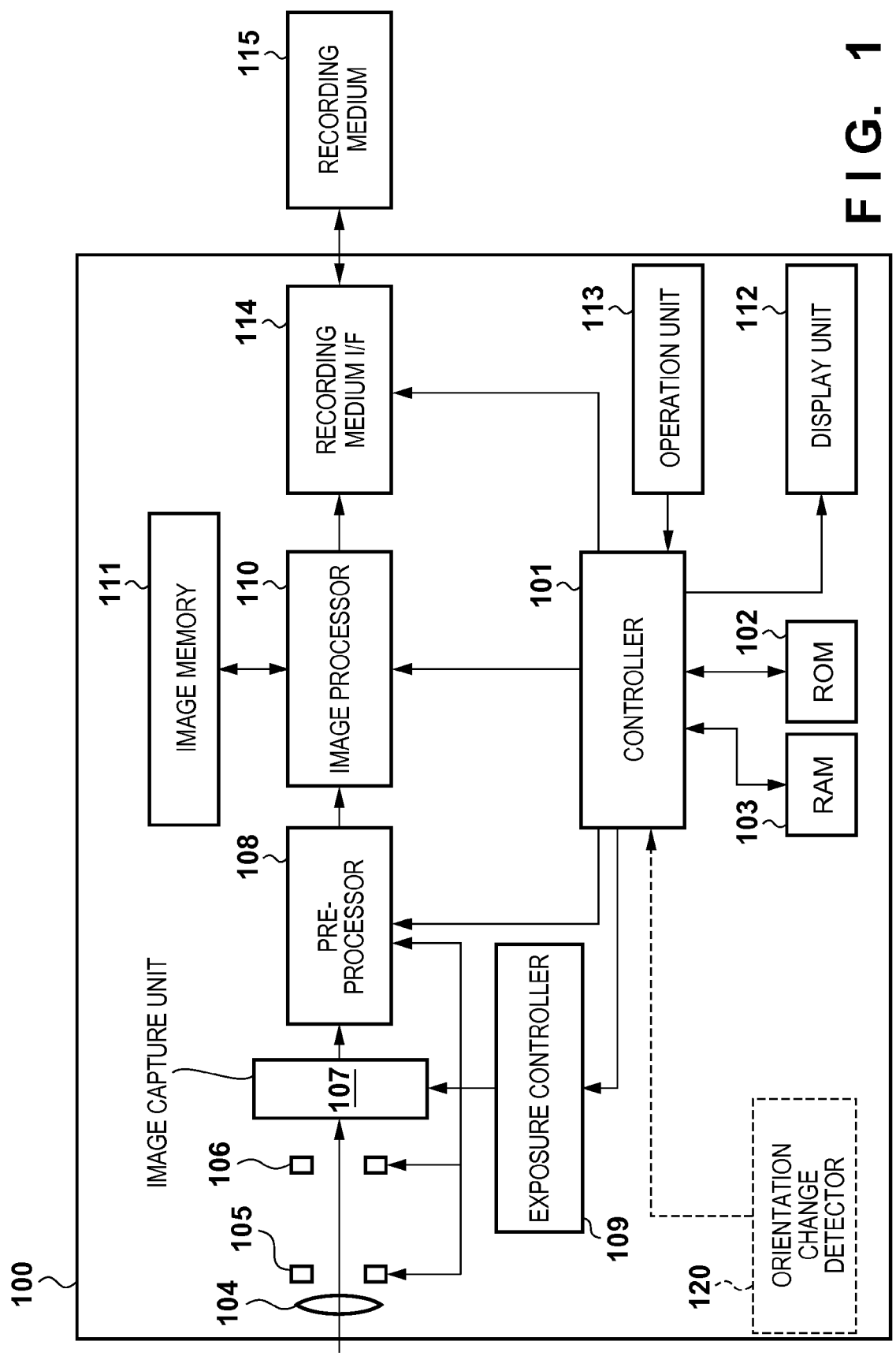
FIG. 1 is a block diagram showing the functional arrangement of a digital camera 100 according to an embodiment of the present invention.

FIG. 1 is a block diagram showing the functional arrangement of a digital camera 100 according to an embodiment of the present invention.

A controller 101 is, for example, a CPU. The controller 101 controls operations of respective blocks included in the digital camera 100 by reading out an HDR image generation processing program (to be described later), which is stored in a ROM 102, expanding the readout program on a RAM 103, and executing the expanded program. The ROM 102 is, for example, a register such as a rewritable nonvolatile memory. The ROM 102 stores information of control parameters and the like required for the operations of the respective blocks included in the digital camera 100 in addition to the HDR image generation processing program. The RAM 103 is, for example, a volatile memory. The RAM 103 is used not only as the expansion region of the HDR image generation processing program, but also as a temporary storage area of intermediate data output during the operations of the respective blocks included in the digital camera 100.

Note that in the following description of this embodiment, respective processes are implemented by the respective blocks included in the digital camera 100 as hardware components. However, the present invention is not limited to such specific embodiment, and the processes of the respective blocks may be implemented by programs which can implement the same processes as those of the respective blocks.

An aperture 105 is an exposure control element, which is disposed on a pupil plane of an optical system 104 and adjusts a light amount by partially intercepting light that enters a surface of an image capture unit 107. A mechanical shutter 106 is an exposure control element, which adjusts an amount of light that enters over time by physically intercepting rays that enter the surface of the image capture unit 107.

The image capture unit 107 is configured by an image capture element, that is, a single plane element which is formed by laying color filters in, for example, a Bayer array pattern, and receives a subject image by a single plane, a three-plane element which separates color information into three or more using a spectral prism (not shown), and receives respective light rays by independent image capture elements, or the like. The image capture unit 107 photoelectrically converts a subject image formed via the optical system 104 which includes a plurality of lenses and mirrors. Then, the image capture unit 107 outputs an analog image signal obtained by photoelectric conversion to a pre-processor 108.

Note that when the image capture unit 107 is configured by the three-plane element, it requires a spectral optical element, but Bayer array interpolation processing in an image processor 110 (to be described later) can be omitted. Also, the image capture unit 107 is also an exposure control element which adjusts a light amount by controlling accumulation times and read timings of image capture elements, since the image capture elements have an electronic shutter function.

The pre-processor 108 applies, to the input analog image signal, noise removal by means of correlated double sampling (CDS), exposure control using gain adjustment by means of auto gain control (AGC), black level correction, and A/D conversion processing, and outputs a digital image signal. Various processes executed in the pre-processor 108 are also called AEF (analog frontend) processes since they are pre-processes for the analog image signal.

In this embodiment, in order to time-divisionally capture a plurality of differently exposed images, the controller 101 controls exposure control operations in the aperture 105, mechanical shutter 106, image capture unit 107, and pre-processor 108 using an exposure controller 109. More specifically, the exposure controller 109 controls an aperture amount of the aperture 105, a full aperture time of the mechanical shutter 106, accumulation times and read timings of the image capture elements, and a gain adjustment amount in the pre-processor 108 in accordance with pieces of exposure information of a plurality of images input from the controller 101.

The image processor 110 applies, to the input digital image signal, image processes such as Bayer array interpolation, linear matrix processing, white balance adjustment, YCC conversion, color difference/tone/contrast correction, and edge emphasis processing. The image processor 110 can generate one output image (an image associated with a single normal image capture operation) by applying these image processes. The generated image is stored in, for example, an image memory 111 (to be described later). Alternatively, the generated image is recorded in a recording medium 115 via a recording medium I/F unit 114. Various image processes executed by the image processor 110 are called DBE (digital backend) processes, contrary to the AFE processes of the pre-processor.

In this embodiment, assume that the image processor 110 executes image processes including composition processing, which are executed in respective steps required to generate an HDR image whose dynamic range is extended from a plurality of differently exposed images. The plurality of differently exposed images used in the HDR image generation processing are sequentially stored in the image memory 111 after application of the DBE processes in the image processor 110. The image processor 110 reads out respective images from the image memory 111, and applies the required processes to them.

Also, when conversion processing such as compression/encoding is required according to a recording format of a captured image, which is stored in, for example, the ROM 102, the image processor 110 applies that processing to image data, thus generating image data to be recorded.

The image memory 111 is an image storage area included in the digital camera 100. The image memory 111 may temporarily store not only image data obtained by the HDR image generation processing, but also intermediate image data, which is obtained by applying some of the DBE processes, as needed. Images stored in the image memory 111 may be RAW image data of three planes, to which, for example, Bayer array interpolation and linear matrix processing have been applied, RGB image data which have further undergone white balance adjustment, or YCC image data to which YCC conversion has been applied. Note that this embodiment will give the following description under the assumption that images for the HDR image generation processing, which are stored in the image memory 111, are YCC images. However, images used in the HDR image generation processing (to be described later) are not limited to those on a YCC color space, but images on other color spaces may be used.

A display unit 112 is, for example, a display device such as a compact LCD, which is included in the digital camera 100, and displays a captured image, generated HDR image, or image read out from the recording medium 115 via the recording medium I/F unit 114 (to be described later).

An operation unit 113 is a user interface, which includes a shutter button, menu button, and the like included in the digital camera 100, and is used to accept operation inputs from the user. The operation unit 113 analyzes an operation input made by the user, and outputs a signal corresponding to that operation input to the controller 101. Also, the operation unit 113 is not limited to physical operation members (the aforementioned shutter button, menu button, and the like), but it may include a touch panel sensor. For example, in this case, the operation unit 113 outputs information of a position on a display region of the display unit 112 operated by the user to the controller 101.

The recording medium I/F unit 114 is an interface used to, for example, write image data and the like generated by the image processor 110 in the connected recording medium 115 or to read out data from the recording medium 115. The recording medium 115 may be, for example, an internal memory included in the digital camera 100, or a recording device such as a memory card or HDD, which is detachably connected to the digital camera 100.

<HDR Image Generation Processing>

Figure 3:
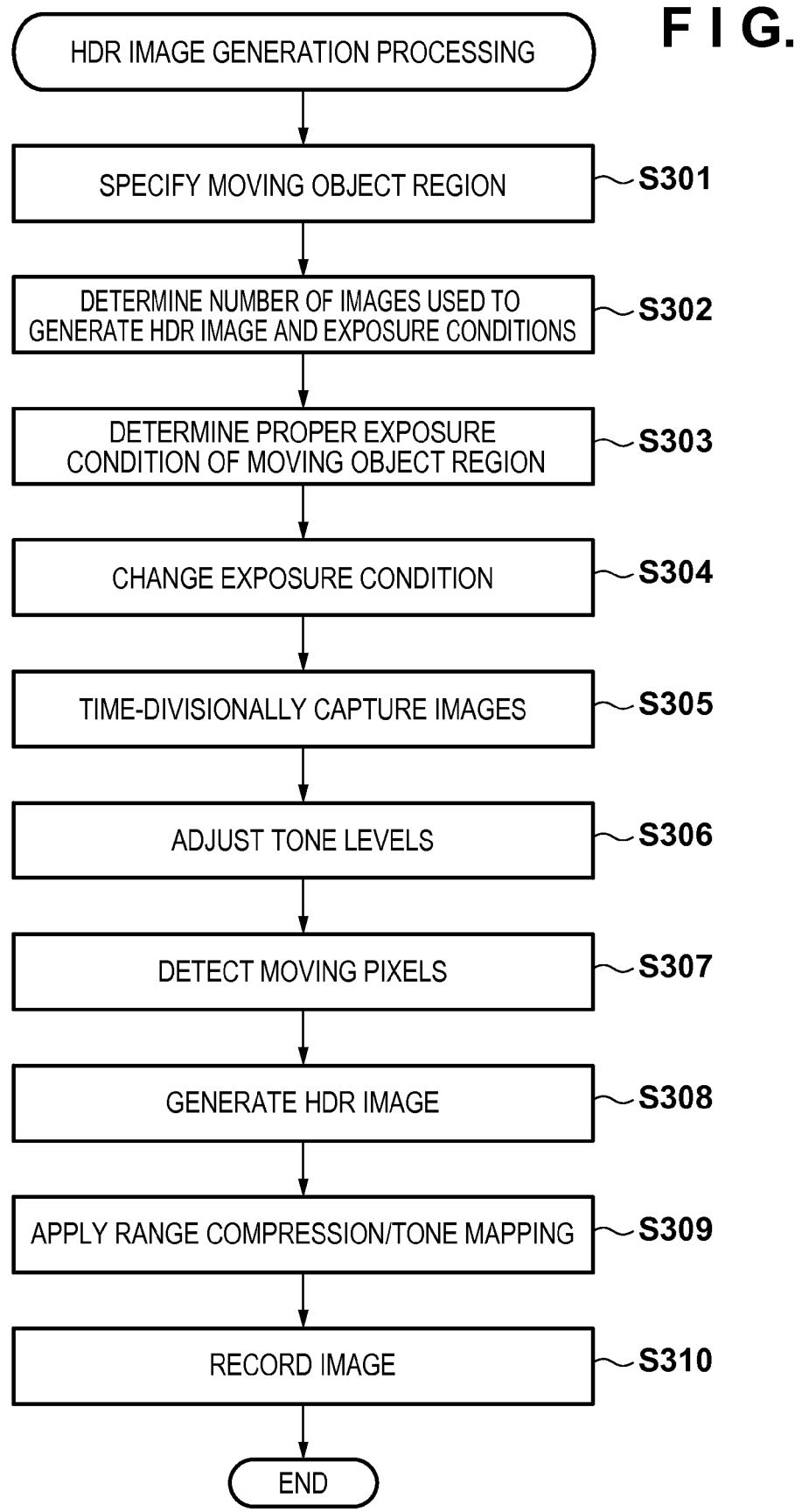
FIG. 3 is a flowchart of HDR image generation processing according to the embodiment of the present invention.

The HDR image generation processing of the digital camera 100 of this embodiment with the aforementioned arrangement will be practically described below with reference to the flowchart shown in FIG. 3. The processing corresponding to this flowchart can be implemented when the controller 101 reads out a corresponding processing program stored in, for example, the ROM 102, expands the readout program onto the RAM 103, and executes the expanded program. Note that the following description will be given under the assumption that this HDR image generation processing is started, for example, when the user operates the shutter button while an image capture mode of the digital camera 100 is set in an HDR image capture mode.

In step S301, the controller 101 specifies moving object regions in an imaging field angle (first specifying), and stores the specified region in the RAM 103. Each moving object region indicates a region including a moving subject such as a subject which is moving, which subject is included in each image captured to generate an HDR image. More specifically, the controller 101 obtains a plurality of pre-shot images, which are time-divisionally captured, from the image memory 111, and calculates pixel value differences for the plurality of pre-shot images. Then, the controller 101 checks whether or not each difference is equal to or larger than a predetermined threshold $Th_{MOV}$ required to judge a moving object, thereby specifying a moving object region for each pixel. In this embodiment, the controller 101 controls the pre-processor 108 and image processor 110 to apply predetermined processes to two pre-shot images, which are time-divisionally captured under the same exposure condition, thereby generating images of the YCC format. Then, the controller 101 controls to calculate differences of luminance components of the two pre-shot images of the YCC format, and compares the calculated difference for each pixel with the threshold $Th_{MOV}$.

For example, when moving object regions are detected using two pre-shot images 401 and 402 obtained by time-divisionally capturing subjects including a moving object 410, as shown in FIGS. 4A and 4B, the controller 101 divides each of the images into a plurality of blocks, and calculate luminance component differences for respective blocks. In the example shown in FIGS. 4A to 4C, blocks which are indicated by filled circles in FIG. 4C and the luminance values of which are changed by movement of the subject are specified as moving object regions.

Note that in this embodiment, the controller 101 specifies moving object regions using the two pre-shot images which are time-divisionally captured under the same exposure condition. When exposure conditions of pre-shot images are different, tone levels of the two pre-shot images are adjusted according to the exposure conditions so that tone levels for identical subjects are equal to each other, thus allowing the controller 101 to execute comparison. However, when the pre-shot images include a blown-out highlight region or shadow-detail loss region due to the different exposure conditions, since that region changes depending on the exposure conditions, a partial region of a still object is consequently detected as a moving object region.

In generation of an HDR image, when "a region corresponding to a moving object includes a blown-out highlight region or shadow-detail loss region", image discontinuity may occur by assigning pixels sampled from a plurality of images having different exposure conditions to a moving object region. By assigning pixels sampled from one image to that region, image discontinuity can be avoided. However, when blown-out highlight or shadow-detail loss pixels are assigned to that region, as described above, the obtained image has a low dynamic range extending effect. That is, for an HDR image generated by processing including such pixel assignment, an image discontinuity problem is avoided, but a preferred result about dynamic range extension as an original purpose is unlikely to be obtained. For this reason, in this embodiment, a preferred exposure condition (proper exposure condition) is set at least for a moving object region, and an HDR image is generated using an image captured under that condition. At this time, when changes of blown-out highlight or shadow-detail loss pixels generated in a still object region are managed to detect as a moving object region according to changes of the exposure conditions, the determined exposure conditions may be deviated from a preferred exposure condition for a strict moving object.

Figure 5:
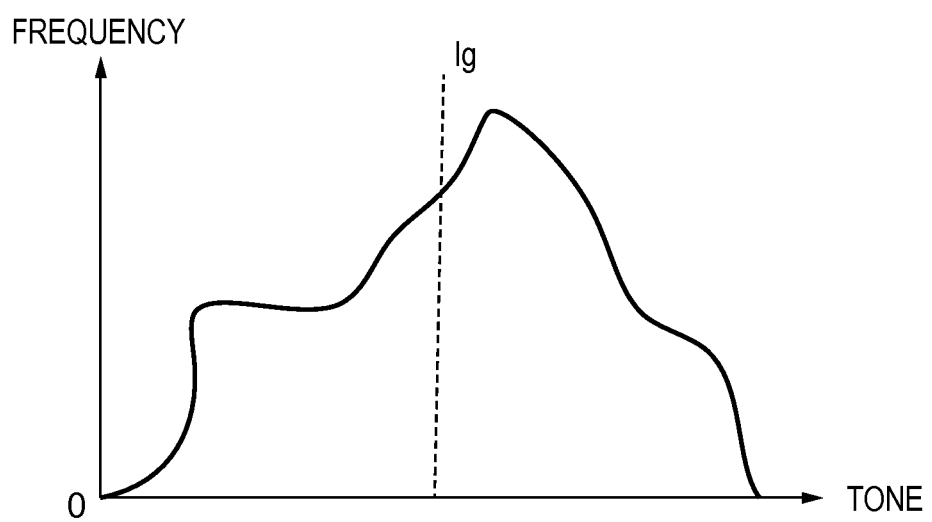
FIG. 5 is a graph for explaining exposure condition settings according to the embodiment of the present invention.

When a proper exposure condition is determined for one region, the controller 101 calculates a weighted centroid $I_g$ of a tone distribution from the tone distribution of that region, as shown in FIG. 5. Then, the controller 101 determines an exposure condition including the weighted centroid $I_g$ of the tone distribution in the vicinity of a median of a predetermined tone range. That is, for example, an exposure condition, which is determined in consideration of changes of blown-out highlight pixels included in a still object region, has a lower exposure amount than a case which considers only a moving object since the weighted centroid of the tone distribution is located on a high tone side. That is, when pixels of an image captured under the exposure condition determined in this manner are assigned as those of a moving object region, that region may include shadow-detail loss pixels due to a low exposure amount. For this reason, in this embodiment, when a moving object region is detected using a plurality of pre-shot images having different exposure conditions, pre-shot images free from any changes of blown-out highlight and shadow-detail loss pixels or including small change amounts in the respective exposure conditions are used.

Note that the description of this embodiment will be given under the assumption that a moving object region is specified using two pre-shot images captured under the same exposure condition. However, the present invention is not limited to such specific moving object specifying method. For example, three or more pre-shot images may be used to determine a moving object region, and a plurality of pre-shot images may be images captured under different exposure conditions. When images captured under different exposure conditions are used, it is preferable to capture the respective images under exposure conditions which do not cause changes of blown-out highlight and shadow-detail loss pixels in a still object region, as described above.

Upon specifying a moving object region, a blown-out highlight region or shadow-detail loss region may often include a moving object depending on exposure conditions. For this reason, the controller 101 may determine a final moving object region by combining moving object regions specified from a plurality of pre-shot images respectively obtained under different exposure conditions such as an exposure condition on a low-exposure side and that on a high-exposure side.

A plurality of moving object regions may be specified for respective regions in a field angle. A plurality of divisionally specified moving object regions can be obtained by grouping pixels corresponding to moving objects. More specifically, the controller 101 executes grouping with reference to coordinate information of pixels using luminance values and color information of the pixels as additional information.

Figure 6A:
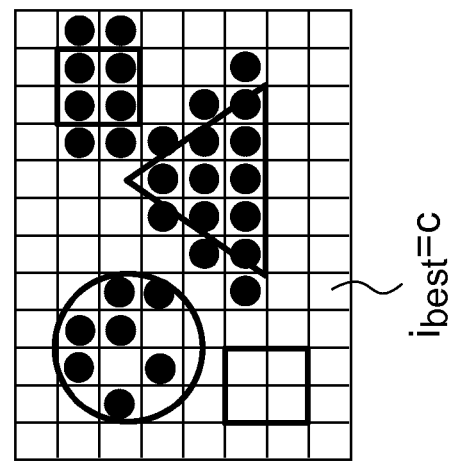
FIGS. 6A, 6B, and 6C are views for explaining grouping processing of pixels corresponding to moving objects according to the embodiment of the present invention.
Figure 6B:
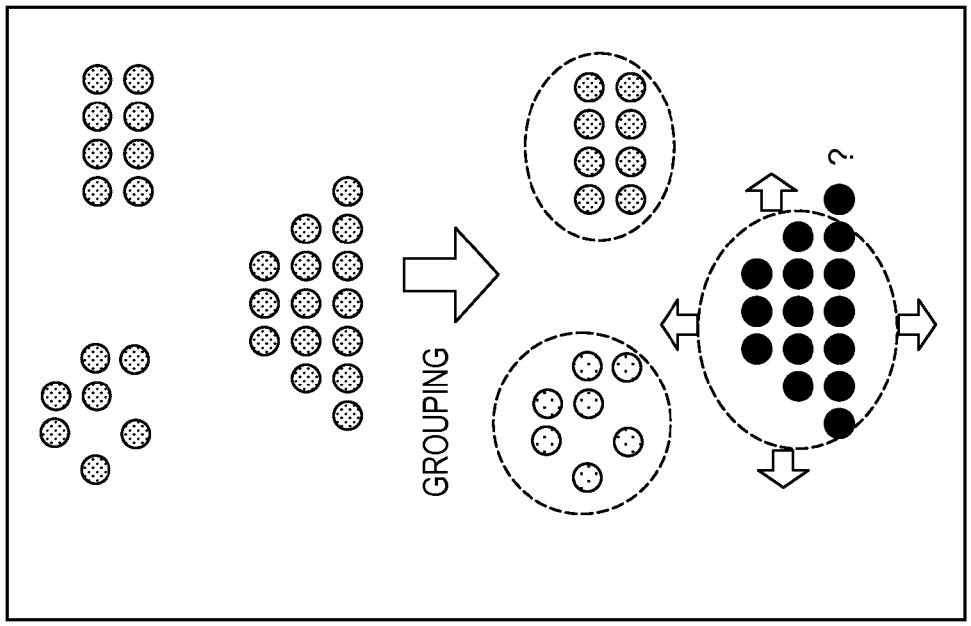
Figure 6C:
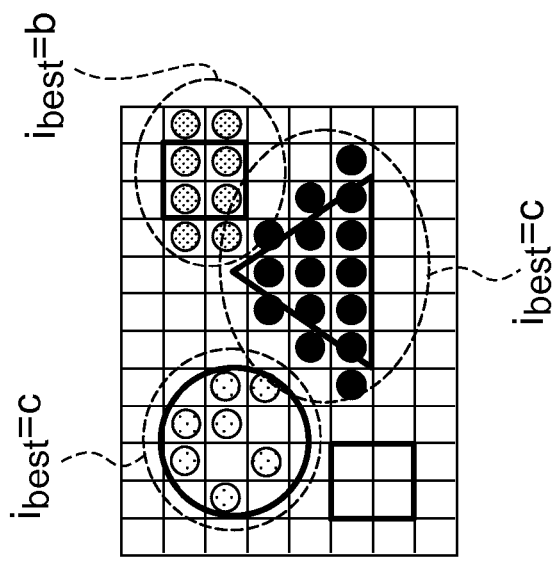

Grouping of pixels corresponding to moving objects will be described below with reference to FIGS. 6A to 6C. For example, when pixels corresponding to moving objects detected in this step are distributed, as shown in FIG. 6A, the controller 101 may execute processing related to grouping using a region growing method so as to group pixels corresponding to moving objects which fit into identical conditions.

The region growing method is one general image processing, which combines elements finely divided initially (for example, for respective pixels) based on a certain evaluation value when a difference between an evaluation value of a group and that of each element is equal to or smaller than a predetermined threshold, and does not combine elements otherwise. The region growing method is described in, for example, "Mikio Takagi, Haruhisa Simoda, Handbook of Image Analysis [Revised Edition], University of Tokyo Press".

After completion of the moving object region specifying processing, the controller 101 advances the process to step S302.

In step S302, the controller 101 determines the number of images (two or more) required to generate an HDR image, and exposure amounts (exposure conditions) of these images, and stores them in the RAM 103. Information of the number of images required to generate an HDR image and exposure amounts of the respective images may be, for example, set in advance and stored in the ROM 102, or may be determined in accordance with the photometry processing result of a subject. In this embodiment, the controller 101 controls the image capture unit 107 to execute pre-shooting under an exposure condition on the high-exposure side and that on the low-exposure side, and specifies a highest luminance part and lowest luminance part of a subject from obtained images. Then, the controller 101 determines the number of images required to generate an HDR image from a luminance range calculated from the highest and lowest luminance values, and a dynamic range of the image capture element. Furthermore, the controller 101 determines exposure conditions of respective exposed images including an underexposure amount $E_{UNDER}$ which does not cause any blown-out highlight of the highest luminance part of the subject and an overexposure amount $E_{OVER}$ which does not cause any shadow-detail loss of the lowest luminance part. When the number of images required to generate an HDR image is three or more, the exposure conditions of the respective images may be determined by, for example, evenly distributing values between the exposure amounts $E_{UNDER}$ and $E_{OVER}$.

In the above description of this embodiment, note that the number of images required to generate an HDR image is determined according to the luminance distribution of a subject. Alternatively, the number of images required to generate an HDR image may assume a fixed value.

In step S303, the controller 101 determines a proper exposure condition for moving object regions, and stores it in the RAM 103. When moving object regions are detected, as shown in FIG. 4C, the controller 101 controls a photometry unit (not shown) to execute photometry for a photometry region shown in FIG. 7 corresponding to the moving object regions, and determines a proper exposure condition using the obtained photometry result. As the proper exposure condition determination method, for example, the proper exposure condition may be determined in accordance with the tone distributions of the moving object regions obtained from the photometry result, as described above with reference to, for example, FIG. 5.

In step S304, the controller 101 changes one of the exposure conditions for two or more images used to generate an HDR image (the number of required images is determined in step S302 and is stored in the RAM 103) to the proper exposure condition determined in step S303. More specifically, the controller 101 specifies an exposure condition, whose exposure amount is closest to the proper exposure condition, of those for the two or more images used to generate an HDR image, and changes the specified exposure condition to the proper exposure condition.

That is, in this embodiment, upon generation of an HDR image, since pixels of one image captured under the proper exposure condition are assigned at least to the moving object regions, the exposure conditions of the two or more images used to generate an HDR image are required to include the proper exposure condition. That is, since the exposure conditions of the two or more images used to generate an HDR image are determined according to the luminance distribution of the overall subject in step S302, they are unlikely to include the proper exposure condition, and one of these exposure conditions is changed to the proper exposure condition in this step.

For example, a case will be examined below wherein the number of images required to generate an HDR image is 2, and the exposure amounts $E_{UNDER}$ and $E_{OVER}$ and a proper exposure condition $E_{MV}$ have the relationship shown in FIG. 8A. At this time, since the exposure amount $E_{UNDER}$ is closest to the proper exposure condition $E_{MV}$, the controller 101 changes the exposure conditions of the two images required to generate an HDR image to the proper exposure condition $E_{MV}$ and the exposure amount $E_{OVER}$, as shown in FIG. 8B. Likewise, a case will be examined below wherein the number of images required to generate an HDR image is 3, and the underexposure amount $E_{UNDER}$, an exposure amount $E_{MID}$ of a halftone image, and the overexposure amount $E_{OVER}$, and the proper exposure condition $E_{MV}$ have the relationship as shown in FIG. 8C. At this time, since the exposure amount $E_{MID}$ is closest to the proper exposure condition $E_{MV}$, the controller 101 changes the exposure conditions of the three images required to generate an HDR image to the proper exposure condition $E_{MV}$ and exposure amounts $E_{UNDER}$ and $E_{OVER}$, as shown in FIG. 8D.

As described above, in this HDR image generation processing, moving object regions of a subject are detected, and the exposure conditions of images required to generate an HDR image as well as the proper exposure condition for the moving object regions are determined in steps S301 to S304. Note that in steps S301 and S302, pre-shot images are captured, and the controller 101 determines the moving object regions and exposure conditions based on the pre-shot images, as described above. However, when pre-shooting operations are executed in the respective steps, since a time required to actually capture images used to generate an HDR image (main shooting) is prolonged, the processes in steps S301 to S303 may be parallelly executed.

Figure 9:
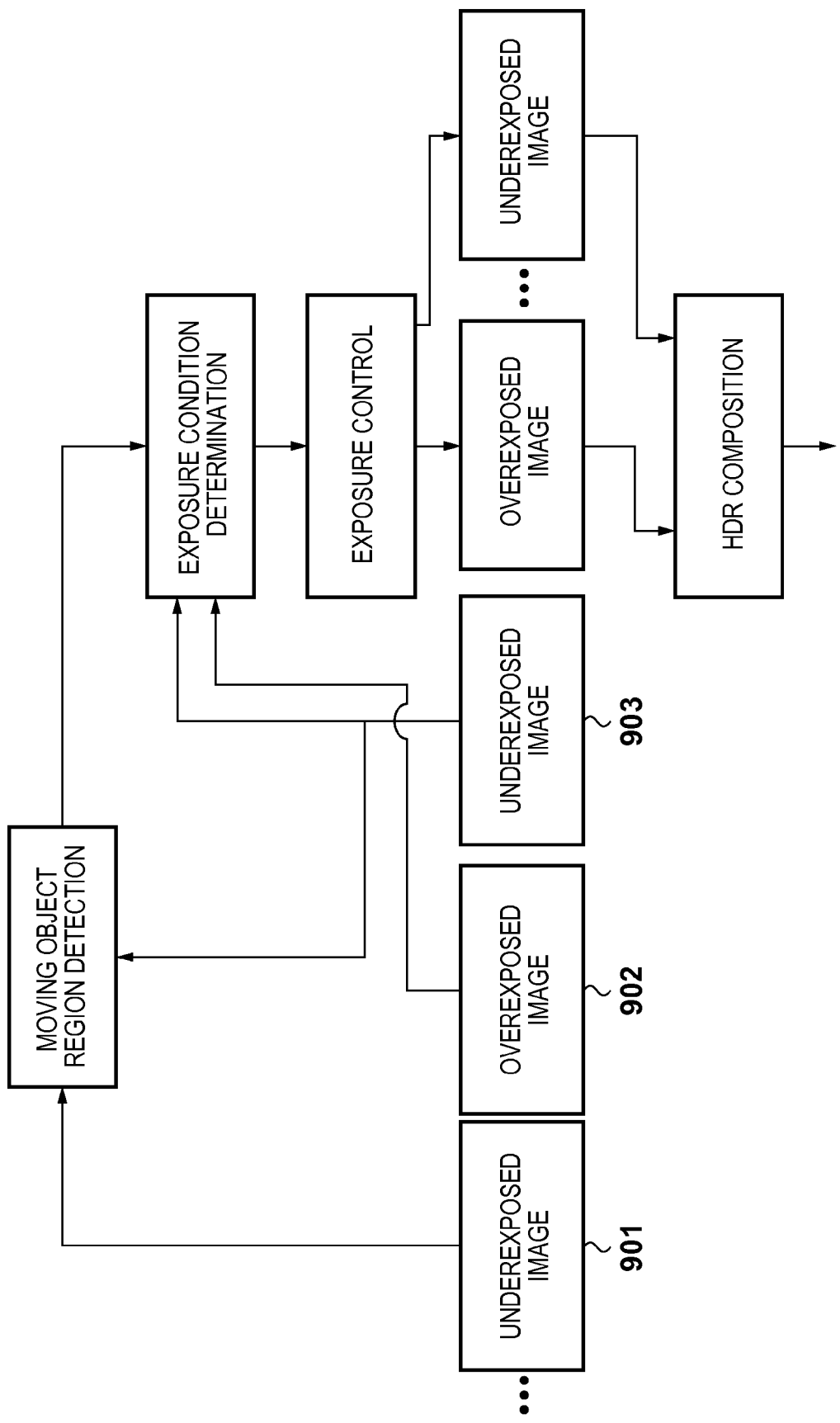
FIG. 9 is a diagram for explaining parallel processing according to the embodiment of the present invention.

For example, as shown in FIG. 9, the controller 101 makes the exposure controller 109 control the aperture 105, mechanical shutter 106, image capture unit 107, and pre-processor 108 to obtain an underexposed image 901, overexposed image 902, and underexposed image 903 in a time-series order until main shooting. The controller 101 may specify a lowest luminance part to determine the exposure amount $E_{OVER}$ in step S302 when the overexposed image 902 is obtained. Also, the controller 101 may specify a highest luminance part to determine the exposure amount $E_{UNDER}$ in step S302 and to further determine exposure conditions of other images required to generate an HDR image when the underexposed image 903 is obtained (under the same exposure condition as the underexposed image 901). At this time, the controller 101 compares the underexposed images 901 and 903 parallel to the above processes to specify moving object regions in step S301, and to determine the proper exposure condition in step S303. After one of the exposure conditions of images required to generate an HDR image is changed to the proper exposure condition in step S304, the controller 101 may control the exposure controller 109 to execute exposure control to execute main shooting processing and HDR image composition processing in step S305 and subsequent steps.

By executing the parallel processes in this way, a time required until the main shooting operations can be shortened. For example, when the shooting operations are made to generate an immediately preceding HDR image, a time required until the main shooting operations can be further shortened. It is considered that the generation processing of the immediately preceding HDR image is executed for an identical subject if it is executed within a predetermined time period. For this reason, the controller 101 may use the moving object regions or proper exposure condition used to generate the immediately preceding HDR image as information of the moving object regions or proper exposure condition in, for example, step S301 or S303. In this case, information indicating the moving object regions or proper exposure condition may be stored in the RAM 103.

In step S305, the controller 101 makes the exposure controller 109 control the aperture 105, mechanical shutter 106, image capture unit 107, and pre-processor 108 under the changed exposure conditions (step S304) stored in the RAM 103 to obtain a plurality of time-divisionally captured images. Note that the plurality of differently exposed images, which are time-divisionally captured, undergo predetermined processes in the pre-processor 108 and image processor 110 to be converted into images of the YCC format, and the converted images are stored in the image memory 111.

Figure 10:
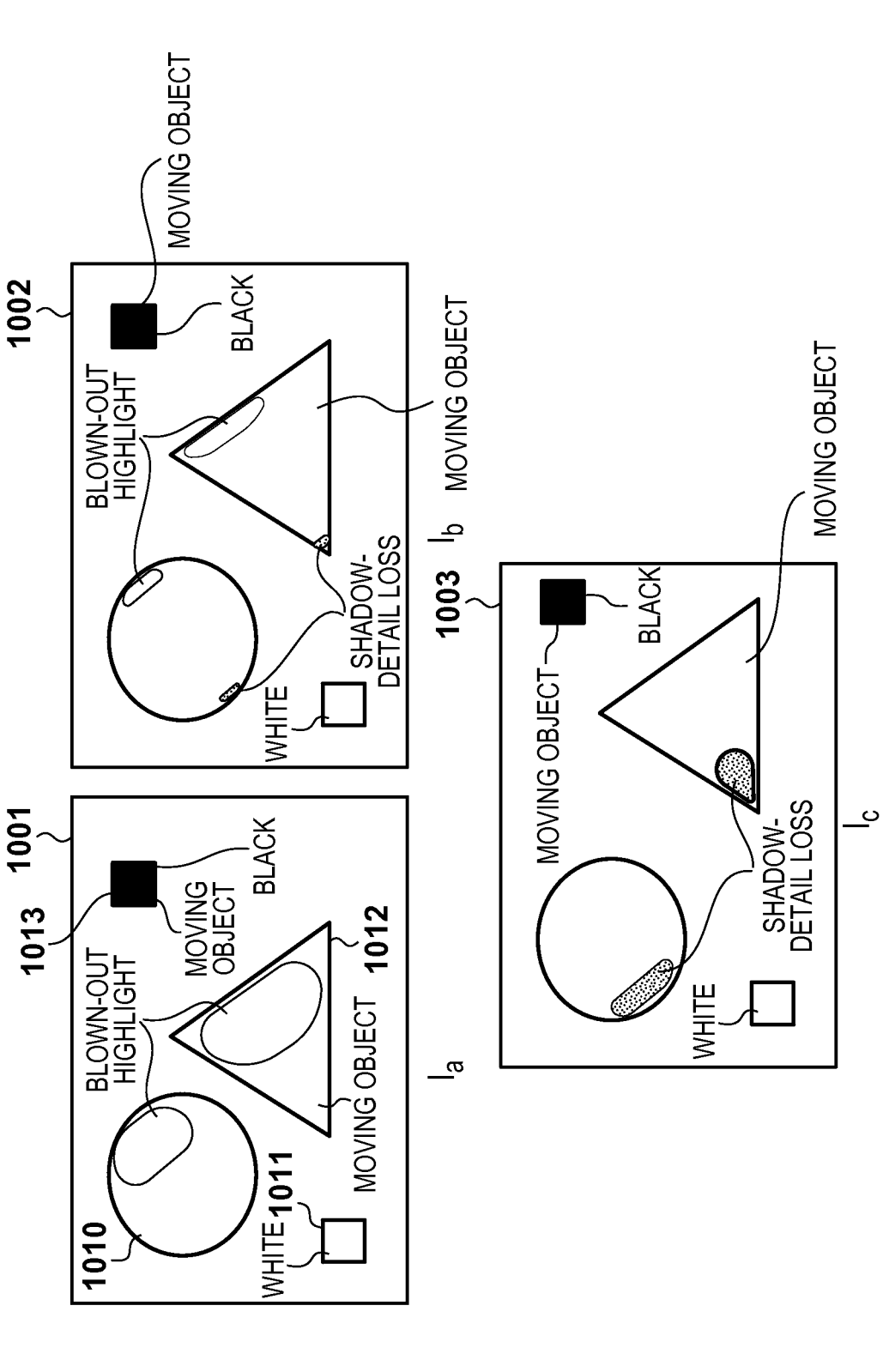
FIG. 10 is a view showing examples of a plurality of differently exposed images according to the embodiment of the present invention.

Note that in the description of this embodiment, an HDR image is generated using three differently exposed images 1001, 1002, and 1003, as shown in FIG. 10 for the sake of simplicity. However, the present invention is not limited to such specific embodiment, and is applicable to generation using two or more differently exposed images. Assume that the exposure amounts of the images 1001 to 1003 are decreased in the order named, and these images are time-serially captured in the same order. In the following description, these images will be referred to as an overexposed image 1001, middle-exposed image 1002, and underexposed image 1003. Each image includes, as subjects, still objects 1010 and 1011 and moving objects 1012 and 1013. During image capture operations of the plurality of images, the moving objects 1012 and 1013 are moving in the right direction with respect to the digital camera 100.

When the digital camera 100 includes a registration function similar to at least an optical or electronic anti-vibration function (not shown), this function is applied to the plurality of differently exposed images obtained in step S305.

In step S306, the controller 101 controls the image processor 110 to execute tone level adjustment processing so as to uniform pixel values associated with identical subjects among the plurality of images stored in the image memory 111. More specifically, the image processor 110 multiplies each of the plurality of images stored in the image memory 111 by a reciprocal of a ratio of an exposure time of that image with reference to the longest exposure time of an image, thus attaining tone level adjustment. Note that the controller 101 controls the image processor 110 to output and store the level-adjusted images in the image memory 111.

Figure 11:
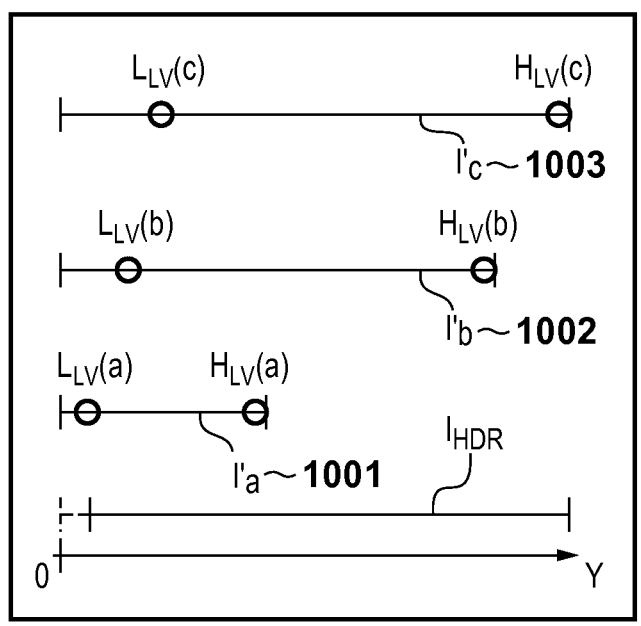
FIG. 11 is a view for explaining a tone range after tone level adjustment due to different exposure times.

FIG. 11 shows tone ranges of the respective images after the tone level adjustment, and a tone range which can be expressed by an HDR image generated using the plurality of images. In FIG. 11, pixel values of luminance Y components of an image are used as a tone range. Also, in the respective level-adjusted images, a blown-out highlight luminance threshold $H_{LV}$ and shadow-detail loss luminance threshold $L_{LV}$ are expressed using reference symbols: a corresponds to the overexposed image 1001; b, the middle-exposed image 1002, and c, the underexposed image 1003.

Note that in this embodiment, a pixel value indicates tone data of a pixel. When a pixel is a chromatic pixel, the pixel value is expressed by a vector amount having elements as many as the number of components of a color space. That is, a value of a specific component on a color space such as a luminance value expresses a scalar amount.

In step S307, the controller 101 detects pixels (moving pixels) corresponding to changes of the subjects in the plurality of level-adjusted images stored in the image memory 111, that is, those corresponding to regions including the moving objects and changes of shadow-detail loss or blown-out highlight states (second specifying). More specifically, the controller 101 reads out two out of the plurality of level-adjusted images stored in the image memory 111, and calculates a difference between pixel values associated with a pixel at the same coordinate position. Then, when the difference between the pixel values is equal to or larger than a predetermined threshold, the controller 101 detects that pixel as a moving pixel. That is, the moving pixels detected in this step include blown-out highlight and shadow-detail loss regions, which change depending on the exposure conditions, unlike the moving object regions specified in step S301. The moving pixels detected in this step indicate pixels to which those of an image captured under the proper exposure condition are to be assigned of images captured to generate an HDR image.

For example, when differences of luminance values are calculated for the middle-exposed image 1002 and underexposed image 1003 with reference to the level-adjusted overexposed image 1001, a Boolean type variable $B_{MOV}$ indicating whether or not pixels of the three images are moving pixels is judged by a Boolean expression given by:

$$B_{MOV} = F(Y_b - Y_a) \lor F(Y_c - Y_a) \qquad (1)$$

where F is a function required to judge whether or not a difference $\Delta Y$ between luminance values of pixels exceeds a threshold $Th_{MOV}$ which is predetermined to judge whether or not these pixels are moving pixels, and is expressed by:

$$F(\Delta Y) = \begin{matrix} 0(|\Delta Y| < Th_{MOV}) \\ 1(|\Delta Y| \geq Th_{MOV}) \end{matrix}$$

Note that this embodiment will give the following description under the assumption that moving pixels are detected using luminance components of pixel values of YCC images stored in the image memory 111. However, the present invention is not limited to such specific embodiment. For example, when images stored in the image memory 111 are RGB images or RAW images, whether or not a pixel is a moving pixel may be judged using absolute values of vectors each indicating respective color components that configure each pixel value or specific color components.

Also, this embodiment will give the following description under the assumption that three images are used to composite an HDR image. When an HDR image is to be composited using images other than three images, Boolean expression (1) changes depending on the number of images. Whether or not pixels at the same coordinate position are moving pixels is judged while requiring at least ((the number of images used in composition)−1) difference calculations. The number of terms of the Boolean expression is equal to the number of difference calculations, and a Boolean expression in which all terms are combined under OR conditions can be used in place of expression (1). Note that this embodiment will give the following description under the assumption that the Boolean expression is judged by calculating, with reference to one image, differences of luminance values between that image and another image. Alternatively, differences of luminance values between two time-serially continuous images may be calculated without setting any standard image.

Figure 12:
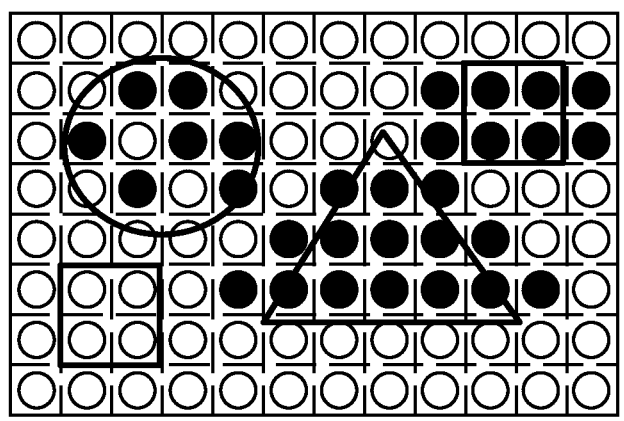
FIG. 12 is a view showing detected moving pixels according to the embodiment of the present invention.

After moving pixels are detected among the overexposed image 1001, middle-exposed image 1002, and underexposed image 1003 shown in FIG. 10, the respective pixels of the image are classified, as shown in, for example, FIG. 12. In FIG. 12, a moving pixel is indicated by a filled circle, and a pixel which does not correspond to a moving pixel is indicated by an open circle.

In step S308, the controller 101 controls the image processor 110 to generate an HDR image whose dynamic range is extended. More specifically, the controller 101 transfers information of the moving pixels detected in step S307 to the image processor 110, and controls the image processor 110 to generate an HDR image by switching processes in correspondence with the moving pixels and other pixels. The image processor 110 generates pixel values of respective pixels of an HDR image to be generated according to the input information of the moving pixels as follows.

As for each pixel determined as a moving pixel, the image processor 110 substitutes intact, in the moving pixel, a pixel value at the same coordinate position in the image, which is captured in step S305 under the proper exposure condition determined in step S303.

As for pixels other than the moving pixels, the image processor 110 may substitute pixel values of any image since these pixels are not determined as moving pixels in step S307, that is, changes of these pixel values fall within the threshold range in all of the plurality of differently exposed images.

Note that when the image capture element has a poor performance or when the pre-processor 108 is susceptible to electricity, noise may be mixed in pixel values. For this reason, pixels other than the moving pixels may be weighted average values of pixel values of all or some of the differently exposed images. The underexposed image is multiplied by a relatively large gain in the level adjustment processing, and is susceptible to noise and quantization errors due to finiteness of tone levels of A/D conversion. For this reason, for example, in weighted averaging, smaller weighting coefficients can be set for the underexposed image.

Assume that the HDR image generated by the image processor 110 in this step is stored in the image memory 111.

In step S309, the controller 101 controls the image processor 110 to apply tone mapping processing or range compression processing to the HDR image generated in step S308, thus generating an HDR image to be finally output.

Note that the range compression processing is that required to match a bit depth when an output image is larger than a desired bit depth.

The tone mapping processing is correction processing required to attain desired tone expression by, for example, raising tone levels of a dark region in an image and compressing tone levels of a bright region. In generation of the HDR image, it is effective to apply the tone mapping processing so as to obscure blown-out highlight and shadow-detail loss tone pixels which remain even after the HDR processing.

In this embodiment, pixel values of one exposed image are assigned to pixels detected as moving pixels upon generation of an HDR image. For this reason, the tone mapping processing can be applied so that blown-out highlight and shadow-detail loss pixels of that exposed image approach a maximum or minimum value of the tone expression. In this manner, in the HDR image to be finally output, blown-out highlight and shadow-detail loss pixels can be obscured.

Also, upon generation of an HDR image, different tone conversion curves to be mapped in the tone mapping processing may be used in accordance with the numbers of blown-out highlight and shadow-detail loss pixels included in the exposed image, whose pixels are assigned to those detected as moving pixels.

Figure 13:
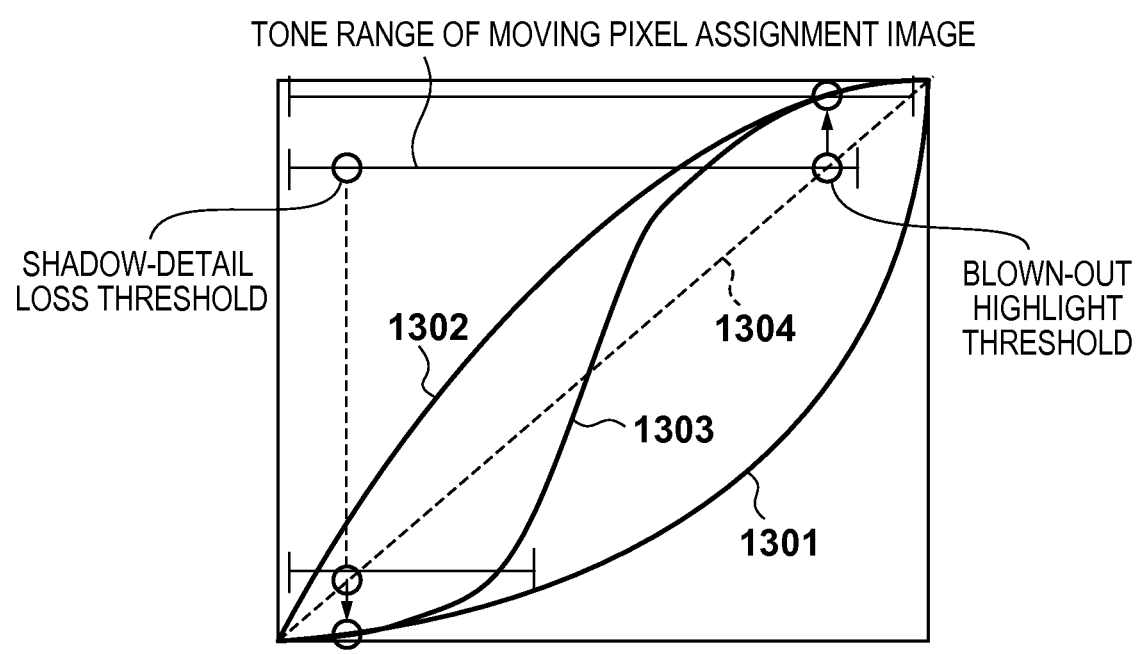
FIG. 13 is a view for explaining tone mapping processing according to the embodiment of the present invention.

For example, upon generation of an HDR image, when the number of shadow-detail loss pixels is larger than that of blown-out highlight pixels in the exposed image to be assigned to pixels detected as moving pixels, processing can be done to map these pixels on a conversion curve 1301 shown in FIG. 13. In FIG. 13, the abscissa plots tone values of an image which is to undergo tone mapping, and the ordinate plots tone values after the tone mapping. These axes express higher tone levels in the right direction or upper direction. In FIG. 13, a broken line 1304 shown on a diagonal line expresses a tone conversion curve used when tone correction by means of tone mapping is to be skipped. That is, the conversion curve 1301 is designed to get tone values of shadow-detail loss pixels closer to the low tonal end, and to extend tone expression widths of pixels equal to or higher than shadow-detail loss tones, so as to obscure shadow-detail loss pixels in the exposed image.

Conversely, when the number of blown-out highlight pixels is larger than that of shadow-detail loss pixels in the exposed image, these pixels are mapped on a conversion curve 1302. When a subject has a broad dynamic range, and when the exposed image includes both shadow-detail loss and blown-out highlight pixels at similar ratios, a conversion curve 1303 is used. Thus, since tone values of shadow-detail loss pixels are got closer to the low tonal end, and those of blown-out highlight pixels are got closer to the high tonal end, a halftone expression range can be broadened, and the shadow-detail loss and blown-out highlight pixels can be obscured.

In this manner, by dynamically changing the tone conversion curves to be applied in the tone mapping processing, shadow-detail loss and blown-out highlight pixels can be obscured in the HDR image to be finally output.

The processing of this step need not be executed when the bit depth of the HDR image generated in step S308 is the same as that of the HDR image to be finally output, or when tone characteristics have already exhibited desired characteristics.

In step S310, the controller 101 controls the image processor 110 to apply predetermined encoding processing to the HDR image to be finally output so as to convert that image into a predetermined recording format, and to output and record the processed image in the recording medium 115 via the recording medium I/F unit 114, thus ending this processing. Also, when exposure control information such as a focal length and aperture value is recorded as metadata simultaneously with the HDR image, the controller 101 obtains required image capture setting information and state information, and records them in the recording medium 115.

Note that this embodiment has explained the case in which the HDR image to be finally output is recorded. However, when image processes such as tone/color/contrast correction and edge emphasis are further applied to the HDR image, that HDR image may be stored in the image memory 111.

This embodiment has explained the case in which an HDR image is generated using a plurality of images like those which are captured using a tripod, and in which positions of still subjects in an image, which are included in a scene to be captured, are left unchanged. However, the present invention is not limited to this. When the positions of the still subjects in a captured image, which are included in the scene to be captured, change due to the influence of, for example, a camera shake, position alignment between images is executed by a known method, and pixels corresponding to changes of subjects may then be judged. As for the influence of a camera shake, orientation information of the digital camera 100 upon shooting each image is detected using, for example, an orientation change detector 120 indicated by the broken line in FIG. 1, and the influence may be corrected at the time of comparison or composition of images.

This embodiment has explained the case in which the plurality of differently exposed images, which are captured time-divisionally, are used. However, the present invention is also applicable to a case in which an HDR image is generated using images of the same scene to be captured (for example, images at the same time on different image capture dates).

As described above, the image capture apparatus of this embodiment can avoid image discontinuity in an image, the tone range of which is extended by compositing a plurality of differently exposed images. More specifically, the image capture apparatus determines the number of images (two or more images) used to generate an HDR image, and exposure conditions respectively for the two or more images from the distribution of pixel values of the overall subject. After moving object regions included in images are specified from a plurality of time-divisionally captured images, a proper exposure condition is determined for positions corresponding to the moving object regions, and one of exposure conditions of the two or more images is changed to the proper exposure condition. Then, the image capture apparatus adjusts tone levels of two or more images captured under the determined exposure conditions including the changed proper exposure condition, and specifies regions in which differences of corresponding pixel values between two or more images are equal to or larger than the threshold. Then, pixels of the image captured under the proper exposure condition are used as those of the specified regions in which pixel value differences are equal to or larger than the threshold, and the two or more images are composited for other pixels, thus generating an HDR image.

In this manner, an HDR image which can avoid image discontinuity even when regions corresponding to moving objects include blown-out highlight or shadow-detail loss regions, and which includes pixels of these regions as those captured under a preferred exposure condition can be generated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-247962, filed Nov. 11, 2011, which is hereby incorporated by reference herein in its entirety.

What is claimed is:

1. An image capture apparatus for generating a dynamic range-extended image by compositing a plurality of images to be composited, comprising:
    an image capture unit configured to output an image obtained by capturing a subject;
    a determination unit configured to determine a number of images to be composited used to generate a dynamic range-extended image, and exposure conditions for the respective images to be composited from a distribution of pixel values of the subject;
    a first specifying unit configured to specify a moving object region for a plurality of pre-shot images output from the image capture unit;
    a change unit configured to determine a proper exposure condition for a subject corresponding to the moving object region specified by the first specifying unit, and to change one exposure condition of the exposure conditions of the images to be composited determined by the determination unit to the proper exposure condition;
    a second specifying unit configured to specify a moving object region for the plurality of images to be composited, which are captured by the image capture unit under the exposure conditions of the images to be composited including the proper exposure condition; and
    a generation unit configured to generate the dynamic range-extended image by compositing the plurality of images to be composited, the generation unit using pixels of the image to be composited captured under the proper exposure condition as pixels of the moving object region specified by the second specifying unit.

2. The apparatus according to claim 1, wherein the change unit changes an exposure condition, an exposure amount of which is closest to the proper exposure condition, of the exposure conditions of the images to be composited determined by the determination unit to the proper exposure condition.

3. The apparatus according to claim 1, wherein the change unit determines the proper exposure condition based on a highest exposure amount of an exposure amount range which does not include blown-out highlight pixels in the moving object region specified by the first specifying unit.

4. The apparatus according to claim 1, wherein the first specifying unit specifies a moving object region used to generate the dynamic range-extended image which has already been generated by the generation unit as the moving object region for the plurality of pre-shot images.

5. The apparatus according to claim 1, wherein the change unit changes one exposure condition of the exposure conditions of the subject images to be composited to the proper exposure condition for the dynamic range-extended image, which has already been generated by the generation unit.

6. The apparatus according to claim 1, wherein the first specifying unit specifies the moving object region using differences between pixel values of the plurality of pre-shot images, which are time-divisionally captured under an identical exposure condition.

7. The apparatus according to claim 1, wherein the second specifying unit adjusts tone levels of the plurality of images to be composited, and specifies, as the moving object region, a region where differences between pixel values of the plurality of images to be composited are not less than a threshold.

8. A control method of an image capture apparatus, which comprises an image capture unit configured to output an image obtained by capturing a subject, and generates a dynamic range-extended image by compositing a plurality of images to be composited, the method comprising:
    a determination step of determining a number of images to be composited used to generate a dynamic range-extended image, and exposure conditions for the respective images to be composited from a distribution of pixel values of the subject;
    a first specifying step of specifying a moving object region for a plurality of pre-shot images output from the image capture unit;
    a change step of determining a proper exposure condition for a subject corresponding to the moving object region specified in the first specifying step, and changing one exposure condition of the exposure conditions of the images to be composited determined in the determination step to the proper exposure condition;
    a second specifying step of specifying a moving object region for the plurality of images to be composited, which are captured by the image capture unit under the exposure conditions of the images to be composited including the proper exposure condition; and
    a generation step of generating the dynamic range-extended image by compositing the plurality of images to be composited, pixels of the image to be composited captured under the proper exposure condition being used as pixels of the moving object region specified in the second specifying step in the generation step.

9. A non-transitory computer-readable recording medium recording a program for controlling a computer to execute respective steps of a control method of an image capture apparatus, which comprises an image capture unit configured to output an image obtained by capturing a subject, and generates a dynamic range-extended image by compositing a plurality of images to be composited, the method comprising:

a determination step of determining a number of images to be composited used to generate a dynamic range-extended image, and exposure conditions for the respective images to be composited from a distribution of pixel values of the subject;

a first specifying step of specifying a moving object region for a plurality of pre-shot images output from the image capture unit;

a change step of determining a proper exposure condition for a subject corresponding to the moving object region specified in the first specifying step, and changing one exposure condition of the exposure conditions of the images to be composited determined in the determination step to the proper exposure condition;

a second specifying step of specifying a moving object region for the plurality of images to be composited, which are captured by the image capture unit under the exposure conditions of the images to be composited including the proper exposure condition; and a generation step of generating the dynamic range-extended image by compositing the plurality of images to be composited, pixels of the image to be composited captured under the proper exposure condition being used as pixels of the moving object region specified in the second specifying step in the generation step.

* * * * *